（12）United States Patent
Cottin et al.

(10) Patent No.: US 11,710,925 B2
(45) Date of Patent: Jul. 25, 2023

(54) DEVICE FOR CONNECTING AN ELECTRIC WIRING HARNESS TO THE REAR OF AN ELECTRICAL CONNECTOR

(71) Applicant: SAFRAN ELECTRICAL & POWER, Blagnac (FR)

(72) Inventors: Jean-Luc Cottin, Moissy Cramayel (FR); Ismaïl Tchaaouaou, Moissy Cramayel (FR); Denis Rinaldi, Moissy Cramayel (FR); Guillaume Crouau, Moissy Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 170 days.

(21) Appl. No.: 17/438,745

(22) PCT Filed: Mar. 12, 2020

(86) PCT No.: PCT/FR2020/050514
§ 371 (c)(1),
(2) Date: Sep. 13, 2021

(87) PCT Pub. No.: WO2020/183111
PCT Pub. Date: Sep. 17, 2020

(65) Prior Publication Data
US 2022/0149563 A1    May 12, 2022

(30) Foreign Application Priority Data

Mar. 14, 2019    (FR) ...................................... 1902631

(51) Int. Cl.
*H01R 13/58*    (2006.01)
*H01R 13/59*    (2006.01)

(52) U.S. Cl.
CPC ........... *H01R 13/582* (2013.01); *H01R 13/59* (2013.01); *H01R 2201/26* (2013.01)

(58) Field of Classification Search
CPC ... H01R 2201/26; H01R 13/582; H01R 13/59
See application file for complete search history.

(56) References Cited

U.S. PATENT DOCUMENTS 5,105,054 A * 4/1992 Kirma .................. H02G 3/0468
174/72 A
5,916,002 A * 6/1999 Gottschalk ............. H01R 13/53
439/839

(Continued)

FOREIGN PATENT DOCUMENTS

DE    90 00 964 U1    4/1990
DE    93 09 840 U1    9/1993

(Continued)

OTHER PUBLICATIONS

International Search Report as issued in International Patent Application No. PCT/FR2020/050514, dated Aug. 14, 2020.

*Primary Examiner* — Briggitte R. Hammond
(74) *Attorney, Agent, or Firm* — Pillsbury Winthrop Shaw Pittman LLP

(57) ABSTRACT

A device for connecting an electric wiring harness to the rear of an electrical connector, includes two half-shells configured to be assembled and to receive within them at least one cable of the electric wiring harness, a rear clamping nut designed to compress the two half-shells radially around the cable, a longitudinal body designed to hold the two half-shells axially, a front clamping nut designed to hold the longitudinal body around the electrical connector, wherein each one of the two half-shells includes an inner pad made of an elastomeric material, configured to be in contact with the cable, and an outer jacket made of a rigid material, at least partially enveloping the inner pad and configured to be in contact with the rear clamping nut.

10 Claims, 2 Drawing Sheets

(56) References Cited

U.S. PATENT DOCUMENTS 6,955,558 B1 * 10/2005 Low .................. H02G 15/18
439/587
9,123,453 B2 * 9/2015 Casanova .......... H01R 13/5845

FOREIGN PATENT DOCUMENTS

DE    20 2016 107070 U1    1/2017
EP         2 568 541 A1    3/2013

* cited by examiner

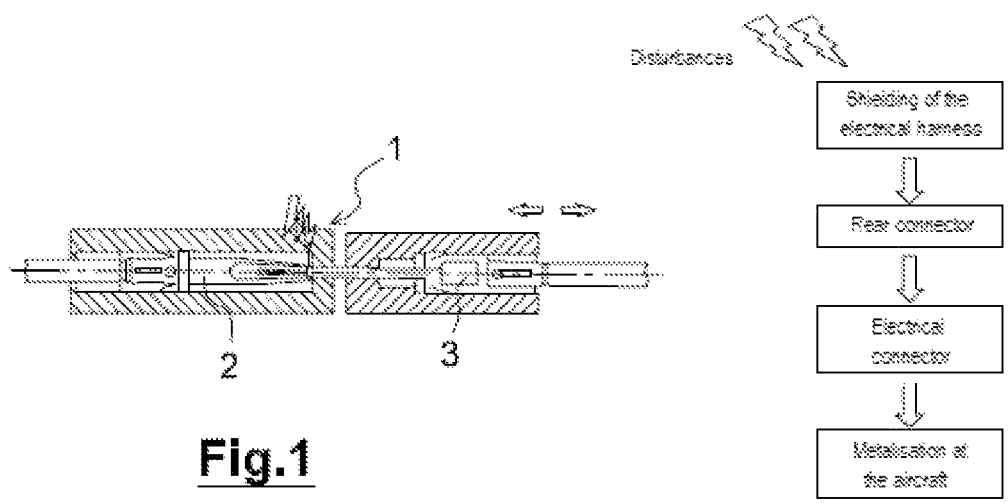
Fig.1
Fig.2
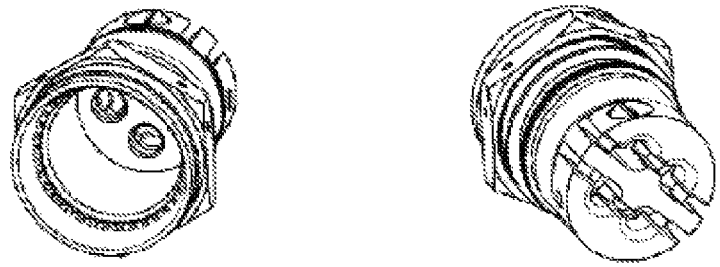
Fig.3
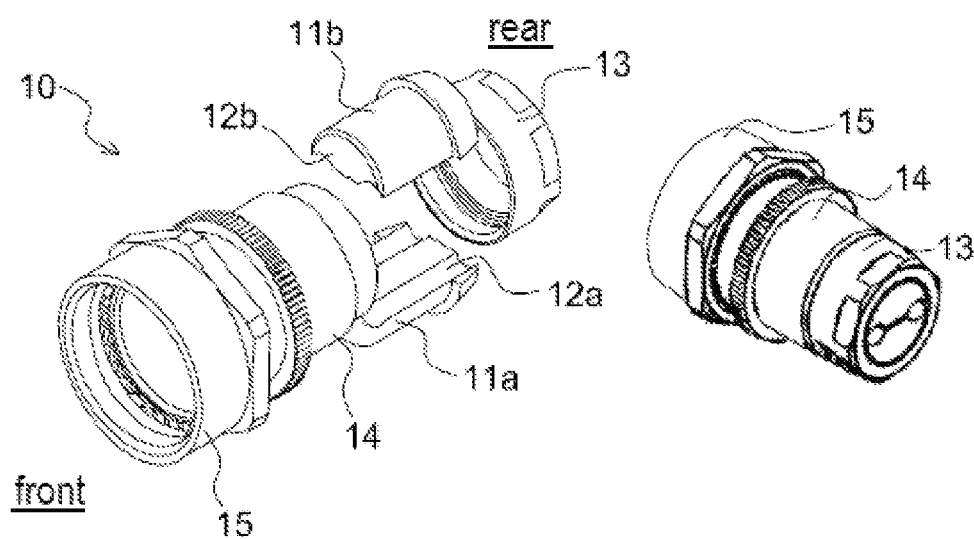
Fig.4

DEVICE FOR CONNECTING AN ELECTRIC WIRING HARNESS TO THE REAR OF AN ELECTRICAL CONNECTOR

CROSS-REFERENCE TO RELATED APPLICATIONS

This application is the U.S. National Stage of PCT/FR2020/050514, filed Mar. 12, 2020, which in turn claims priority to French patent application number 1902631 filed Mar. 14, 2019. The content of these applications are incorporated herein by reference in their entirety.

TECHNICAL FIELD OF THE INVENTION

The present invention relates to a device for connecting an electric wiring harness to the rear of an electrical connector, in particular for an aircraft turbine engine. The invention also relates to an aircraft turbine engine comprising such a device for connecting.

The invention has applications in the field of connection technology and, in particular, in the field of aeronautic connection technology.

TECHNOLOGICAL BACKGROUND OF THE INVENTION

In an aircraft, the various electrical equipment is connected together by a network of electrical connections, said electrical connections being made substantially thanks to electric wiring harnesses. An electric wiring harness comprises one or more electrical cables which each provide an electrical connection between electrical equipment. These electrical cables generally each comprise an electrical conductor protected by a metal braid of electromagnetic shielding and an insulating outer sheath with an anti-friction coating. This anti-friction coating, such as for example PTFE, has for function to prevent mechanical stresses, such as vibrations and/or impacts generated during the flight of an aircraft or deformations or elongations of the structure of the aircraft, from being directly applied on the electrical contacts plugged into the electrical connector.

The ends of the cable or cables of an electric wiring harness are connected to electrical connectors via devices for connecting. Each device for connecting, also called a rear connector, must provide both mechanical functions and electrical functions and fulfil the needs of integration.

A rear connector must, in particular, provide the mechanical maintaining of the electric wiring harness at the rear of the electrical connector. Indeed, although the anti-friction coating makes it possible to prevent mechanical stresses from being applied directly on the electrical contacts, these stresses can be applied to the electric wiring harness and be transferred directly onto the fixed points of said harness. These points fixes are generally the attachment points and the ends of the electric wiring harness. However, if the ends of the electric wiring harness are damaged, or if the connection is deteriorated, an "undesirable" contact resistance can appear, leading to a rise in temperature, a local melting of the connection elements, and even the ignition of a fire. An example of intermittent contact 1, caused by a random movement, between a locked female contact 2 and an unlocked male contact 3 is shown in FIG. 1. The rear connector therefore has for function to prevent the appearance of such an intermittent contact, by guaranteeing resistance to traction and by allowing a maximum displacement of the male contact that is not to be exceeded, in accordance with the standards in effect.

A rear connector must also provide the connection of individual shield clamps of the cables as well as the electromagnetic protection of the electric wiring harness when it exists. The electrical connector, rear connector and electric wiring harness system must, indeed, have an electromagnetic compatibility, which involves two constraints:
limiting the undesirable emission coming from the system, so as to not disturb the other equipment; and
being sufficiently immunised against the disturbances coming from other systems or equipment or, more generally, the environment.

At electric wiring harness, the electromagnetic compatibility is generally provided by the individual shieldings of the cables or by extra shielding of the electric wiring harness. After the electric wiring harness, the rear connector provides the electrical continuity until the electrical connector, itself metalised to the structure of the aircraft, as shown in FIG. 2.

Another function of the rear connector is to guide the electric wiring harness at the outlet of the connector. Indeed, the end of the electric wiring harness has to be guided in order to prevent the cables from rubbing against sharp edges that can damage them, damage of the cabling able to generate an electric arc. The rear connector generally also has the function of forming an axial abutment for the sealing sleeves of the electrical connector. Indeed, in an electrical connector, sleeves are installed at the rear of the electrical contacts in order to seal the cavity of the connector and, thus, limiter the risks of fluid runoff inside said connector and of a short-circuit that that could cause. Furthermore, in the field of aeronautics, a rear connector has to be able to be removed in order to allow for repairs or replacing components.

In aeronautics, it is known to use the rear connector TR4865, diagrammatically shown in FIG. 3, to meet the electrical and mechanical functions and the integration needs mentioned hereinabove. With such a rear connector, the cables are clamped my means of two screws, which can, not only be lost during mounting, but also damage the structure of the cables and/or cause damage to the surrounding systems if they are not be removed.

In order to prevent these problems due to the screws, another rear connector was developed by a manufacturer of connection equipment. This rear connector, shown in FIG. 4, and referenced as 10, comprises a longitudinal body 14, two half-shells 11a, 11b, a front clamping nut 15 and a rear clamping nut 13. The half-shells 11a, 11b are each provided with grooves, respectively, 12a, 12b. The two half-shells 11a, 11b are adapted to be linked together in the longitudinal body 15 in such a way that each groove 12a of a half-shell 11a forms, with a groove 12b of the other half-shell 11b, a duct intended to receive a cable (not shown in the figure). The front clamping nut 15 is provided to maintain the longitudinal body 14 on the electrical connector (not shown in the figure). The rear clamping nut 13 is provided to clamp the two half-shells 11a, 11b around the cables and thus keep the cables clamped inside the rear connector.

However, the two half-shells of this rear connector 10 are made from a thermoplastic material, in particular polytetrafluoroethylene (PTFE), which is a smooth and rigid material with a relatively low coefficient of adhesion. Consequently, even clamped by the rear clamping nut 13, the half-shells 11a, 11b cannot provide good cable retention, in particular because the cables are covered with an anti-friction coating, and therefore anti-adhesive, which prevents adhesion to the thermoplastic material. The rear connector therefore does not correctly fulfil its mechanical functions. In addition, due to the rigid characteristics of the thermoplastic material, the cables are pinched between the half-shells, which can degrade the outer insulating sheath and limit the performance of the electromagnetic shielding.

SUMMARY OF THE INVENTION

To respond to the problems mentioned hereinabove of compression of the cables and of the poor retention of said cables between the half-shells, the applicant proposes a rear connector wherein each one of the half-shells comprises an interior zone, in contact with the cables, made of elastomer and an exterior zone, in contact with the rear clamping nut, made of a rigid material.

According to a first aspect, the invention relates to a device for connecting an electric wiring harness to the rear of an electrical connector, comprising:

two half-shells configured to be assembled and to receive within them at least one cable of the electric wiring harness,
a rear clamping nut designed to compress the two half-shells radially around the cable,
a longitudinal body designed to hold the two half-shells axially,
a front clamping nut adapted to maintain the longitudinal body around the connector.

This device for connecting is characterised by the fact that each one of the half-shells comprises:

an inner pad made of an elastomeric material, configured to be in contact with the cable, and
an outer jacket made of a rigid material, at least partially enveloping the inner pad and configured to be in contact with the rear clamping nut.

This device for connecting—indifferently called rear connector—makes it possible to hold the cables of an electric wiring harness in traction without stressing them and therefore without the risk of damaging them.

Advantageously, the inner pad of the half-shell comprises at least one groove adapted to receive the cable.

In addition to the characteristics mentioned hereinabove, the device for connecting according to the invention can have one or more additional characteristics among the following, considered individually or according to the technically permissible combinations:

the elastomeric material comprises a hardness defined according to a coefficient of adhesion of the cable and/or environmental conditions.
the groove of the inner pad has a geometry defined according to a geometry of the cable so that, combined with the hardness of the elastomeric material, the cable is compressed and held in traction.
the rigid material of the outer jacket is electrically conductive.
the rear clamping nut comprises an inner conical portion and the half-shells comprise an outer conical portion, complementary with the inner conical portion of the rear clamping nut.
the longitudinal body comprises, on an inner wall, a lug forming a protrusion bearing on the half-shells, and forming an axial abutment.
the longitudinal body comprises, on an inner wall, at least one protruding portion pressing on the rear clamping nut and forming a retaining claw.
at least one of the half-shells comprises, on a rear face, an anti-rotation cavity adapted to receive an anti-rotation tool, during the tightening of the rear clamping nut.

According to a second aspect, the invention relates to an aircraft turbine engine, characterised in that it comprises at least one device for connecting such as defined hereinabove.

BRIEF DESCRIPTION OF THE FIGURES

Other advantages and characteristics of the invention shall appear when reading the description, illustrated by the figures wherein:

FIG. 1, already described, diagrammatically shows an example of an intermittent contact between a female contact and a male contact;

FIG. 2, already described, diagrammatically shows the electrical continuity between an electric wiring harness and an electrical connector;

FIG. 3, already described, shows an example of a rear connector according to a prior art;

FIG. 4, already described, shows an example of a rear connector according to another prior art;

DETAILED DESCRIPTION OF AT LEAST ONE EMBODIMENT

An embodiment of a device for connecting an electric wiring harness to the rear of an electrical connector is described in detail hereinafter, in reference to the accompanying drawings. This example shows the characteristics and advantages of the invention. Recall however that the invention is not limited to this example.

In the figures, identical elements are marked with identical references. With a concern for legibility of the figures, the size scales between the elements shown are not respected.

Figure 5:
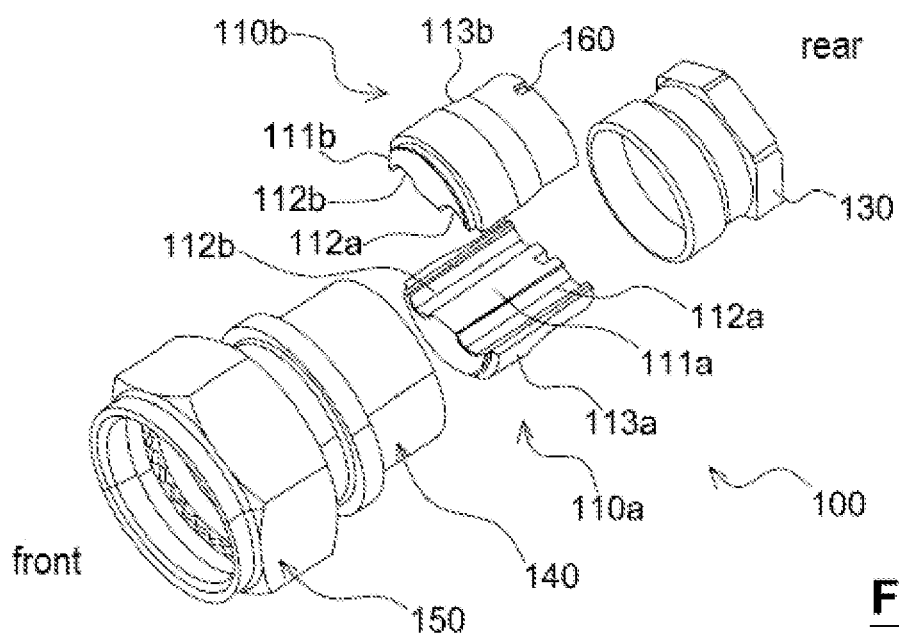
FIG. 5 shows an exploded view of an example of a rear connector according to embodiments of the invention.
Figure 6:
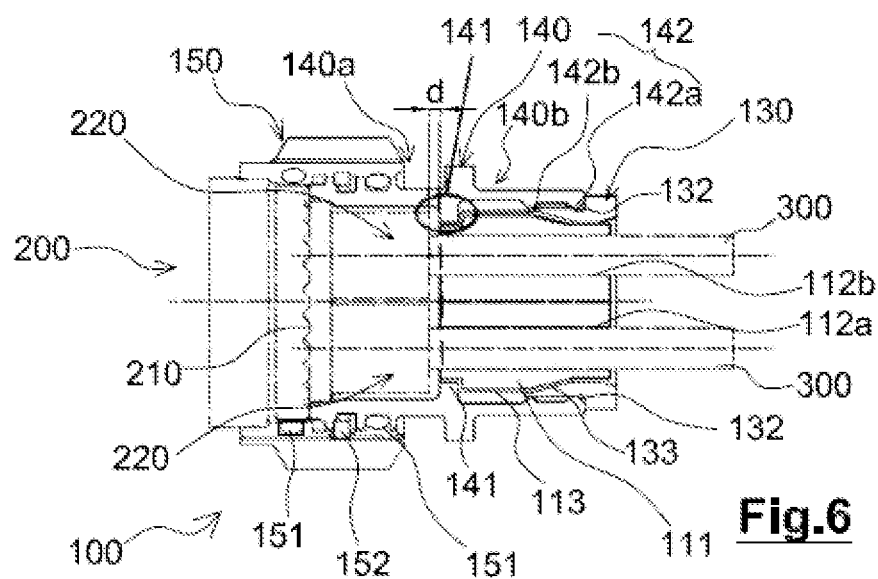
FIG. 6 shows a cross-section view of an example of a rear connector according to embodiments of the invention.

FIG. 5 shows an exploded view of an example of a rear connector 100 according to the invention making it possible to connect an electric wiring harness (represented by two electrical cables 300) to an electrical connector 200. FIG. 6 shows a longitudinal cross-section view of the rear connector 100 when said rear connector is mounted on the electrical connector 200 and when it connects two cables 300 of the electric wiring harness to said electrical connector.

The rear connector 100 comprises, from the front towards the rear, a front clamping nut 150, a longitudinal body 140, two half-shells 110*a*, 110*b* and a rear clamping nut 130. The front clamping nut 150, with conventional geometry and functions, is mounted at the front of the rear connector 100 in order to fasten the longitudinal body 140 to the rear of the electrical connector 200. The longitudinal body 140 is a hollow body adapted to receive, in its front portion 140*a*, the sealing sleeves 220 and the grommet 210 of the electrical connector and, in its rear portion 140*b*, the two half-shells 110*a* and 110*b*. The two half-shells, described in more detail in what follows, are adapted to receive the electrical cables 300. Although, in the examples of FIGS. 5 and 6, the half-shells 110*a*, 110*b* host two cables 300, those skilled in the art will however understand that they can shelter only one cable or two or more than two cables of the electric wiring harness. The rear clamping nut 130 is a nut provided to compress the two half-shells 110*a*, 110*b* around the cables 300.

According to the invention, each half-shell 110a, 110b comprises an inner pad 111a, 111b made of an elastomeric material and an outer jacket 113a, 113b made of a rigid material. The inner pad is adapted to receive and to be in contact with cables 300. The outer jacket is adapted to at least partially surround the inner pad and to be in contact with the rear clamping nut 130.

In the examples of FIGS. 5 and 6, the two half-shells 110a, 110b are symmetrical with one another and positioned facing one another in such a way as, when they are assembled, to form a shell. Each half-shell comprises a curved face and a flat face, the flat faces of the two half-shells being provided to be facing. The curved face, which comprises the outer jacket 113a, 113b, has a geometry that is at least partially adapted to the cavity of the longitudinal body 140. In certain embodiments, a portion at least of the curved face is semi-cylindrical in such a way that, when the half-shells are assembled, the shell is of substantially cylindrical shape.

As shown in the examples of FIGS. 5 and 6, the flat face of each half-shell can comprise at least one groove 112a, 112b. This groove, carried out in the inner pad 111a, 111b of the half-shell, is provided to receive a cable and to be positioned facing the groove 112a, 112b of the other inner pad 111a, 111b when the half-shells are assembled. The two facing grooves can thus house a portion of cable 300. In the examples of FIGS. 5 and 6, each inner pad 111a, 111b comprises two grooves 112a, 112b. The groove 112a of the inner pad 111a and the groove 112a of the inner pad 111b are configured to be complementary and facing each other when the two half-shells are assembled. The grooves 112a of the two inner pads 111a and 111b thus form a duct able to house a cable. The same applies to the grooves 112b of the inner pads 111a and 111b.

In certain embodiments, the facing grooves 112a or 112b of the two inner pads are of similar geometry; each groove can be, for example, of semi-circular section in such a way that, when the two half-shells are assembled, the housing formed by the two grooves is cylindrical; alternatively, each groove can be, for example, of triangular section in such away that, when the two half-shells are assembled, the housing formed by the two grooves is a lozenge. The term "geometry of a groove" means the shape, the disposition and the dimensions of the groove. In certain embodiments, the two grooves have different but complementary geometries in such a way as to form, when the two half-shells are assembled, a housing with a shape adapted to the geometry of the cable 300. In certain embodiments, at least one of the two grooves is of rectilinear geometry. In certain other embodiments, at least one of the two grooves has a non-rectilinear geometry, for example undulated or partially undulated. The geometry of the grooves of the inner pads is defined according to the geometry of the cables to be received, the material of the insulating outer sheath of said cables, etc.

The inner pads 111a, 111b are made from an elastomeric material of which the elastic property provides good resistance in traction of the cables 300 even when the latter are treated to limit friction, which makes them slippery. Indeed, in order to avoid damaging electrical contacts of the cables in the connector, it is important that the half-shells provide good retention of said cables. The clamping exerted on the cables via the half-shells must therefore be adapted to limit the displacement of the cables subjected to traction and be compliant with the maximum displacement authorised by the aeronautical standards. However, the more the cables are compressed, the better the resistance in traction is but the higher the risk of damaging the cables is. Using an elastomeric material around the cables constitutes a compromise that makes it possible to provide good resistance in traction without damaging the cables.

Several elastomeric cables can be used. The choice of the elastomeric material depends on its hardness because the hardness affects the coefficient of adhesion of said material and therefore the resistance in traction of the cable. The elastomeric material must have a hardness that is sufficient to provide the compression of the cables without deforming them. The choice of the elastomeric material also depends on the geometry of the grooves 112. Indeed, a geometry of grooves that is highly adjusted to the geometry of the cables can allow for a weak compression on the cables and therefore a more substantial hardness of the elastomer. On the other hand, if the geometry of the grooves is not adjusted to the geometry of the cables, a strong compression of the whole is required with, consequently, a lower hardness of the elastomer. In other terms, the elastomeric material can be chosen according to a combination between hardness and geometry. The choice of the combination of hardness and geometry must make it possible to respond to aeronautical requirements such as, for example, a maximum displacement standard of the cables that varies according to the references and the assemblies (this standard can be, for example, 0.3 mm).

The choice of the elastomeric material depends, in addition, on the environmental conditions in which the rear connector 100 will be operating. Indeed, according to the applications of the rear connector 100, the elastomeric material can be chosen in such a way as to be compatible, for example, with the environmental temperature (for example a high temperature greater than 200° C. or on the contrary a low temperature less than −65° C.), with the ambient humidity, with the presence of potentially aggressive fluids and/or moulds, etc. The choice of the elastomeric material can also depend on the electrical insulation desired and/or on the coefficient of adhesion of the material used for the anti-friction treatment of the cables.

For example, for an environment comprising a high temperature, a presence of an aggressive fluid, for an electrical insulation resistance of 5 Gohm and for a predefined geometry, the elastomeric material can be a silicone with a hardness of 70 shore which allows for a grip effort of about 40 N.

The outer jacket 113a, 113b of the half-shells 110a, 110b is a jacket made from a rigid material, of low roughness, favouring the sliding of the rear clamping nut 130 on the half-shells during the tightening of said nut. The material of the outer jacket can furthermore be electrically conductive, which makes it possible to provide the electrical continuity between the electric wiring harness and the electrical connector. This material can be, for example, a metal material such as, for example, steel, aluminium, titanium, etc. As with elastomer, the choice of the material of the outer jacket depends on the environmental conditions in which the rear connector 100 will be operating.

The half-shells 110a, 110b formed from an inner pad 111a, 111b made of an elastomeric material and an outer jacket 113a, 113b made of a rigid material have the advantage of compressing the cables 300 so as to provide their resistance in traction without damaging them.

The rear clamping nut 130 is configured to press-fit the two half-shells 110a, 110b positioned facing one another. In certain embodiments, the rear clamping nut 130 comprises an inner portion of conical shape 131, as shown in FIG. 6. The half-shells then have a conical rear outer portion, with a geometry that is complementary to that of the inner portion of the rear clamping nut. Such a configuration offers an improved radial compression of the half-shells. The sizing of the conical geometry of the rear clamping nut and of the half-shells with respect to the tightening torque depends on the materials forming the half-shells, in particular on the hardnesses and coefficient of adhesion of said materials and of the material of which the rear clamping nut is made.

In the examples of FIGS. 5 and 6, the longitudinal body 140 extends axially from the front clamping nut 150 to the rear clamping nut 130 and comprises a front portion 140a adapted to surround the sleeves 220 of the electrical connector 200 and a rear portion 140b adapted to maintain the half-shells 110a, 110b. In its front portion 140a, the longitudinal body 140 comprises, on its outer wall, facing the front clamping nut 150, several protruding zones forming housings adapted to receive O-ring seals 151 and an arresting joint 152 providing, respectively, the sealing and the blocking with the front clamping nut 150.

The longitudinal body 140 further comprises, on the inner wall of its rear portion 140b, a lug 141 forming a protrusion, against the half-shells 110a, 110b. This lug 141 constitutes an axial abutment which, on the one hand, prevents the axial displacement of the half-shells—and consequently the axial displacement of the cables—and on the other hand participates in the axial maintaining of the sealing sleeves 220 of the electrical connector 200. Thus, the sealing sleeves 220, which are radially maintained by the longitudinal body 140 and axially by the abutment 141, participate in the axial resistance of the cables 300. They make it possible, in particular, for the cables 300 passing through the half-shells to stop at sealing sleeves. Thus, the cables 300 are held in traction, in the rear connector 100, by the combined effect of the elastomeric material of the inner pads 111a, 111b and the geometry of the grooves 112a, 112b, and the axial displacement thereof is limited by the presence of the sealing sleeves 220 and of the abutment 141.

According to certain embodiments, and as shown in the examples of FIG. 6, the longitudinal body 140 comprises, on its inner wall at least one protruding portion, pressing against the rear clamping nut and forming a retaining claw 142. This retaining claw 142 has for function to axially maintain the half-shells 110a, 110b in such a way as to prevent a longitudinal displacement of said half-shells in relation to the electrical connector and, consequently, cables 300. The retaining claw 142 can comprise, for example, a first protruding portion 142a, at the end of the inner wall of the rear portion 140b of the longitudinal body, intended to be inserted into a notch 132 of the rear clamping nut 130. The retaining claw 142 can further comprise a second protruding portion 142b on the inner wall of the rear portion 140b of the longitudinal body, at a distance from the first protruding portion 142a and intended to be inserted at the frontmost end 133 of the rear clamping nut 130.

Figure 7:
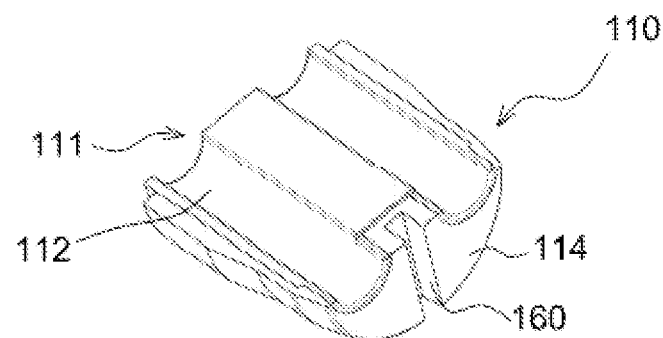
FIG. 7 shows a cross-section view of an example of a half-shell provided with an anti-rotation slot.

According to certain embodiments, at least one of the half-shells 110a, 110b comprises, on its rear face 114, an anti-rotation cavity 160. FIG. 7 shows, according to a cross-section view, an example of a half-shell 110 equipped with such a cavity 160. This anti-rotation cavity 160 is carried out in the rear face 114 of the half-shell 110, i.e. in the radial face farthest from the connector 200. This anti-rotation cavity 160 is adapted to receive an anti-rotation tool, such as for example a flat spanner, making it possible to prevent the rotation of the half-shell 110 during the tightening of the rear clamping nut 130. In the example of FIG. 7, the anti-rotation cavity is a slot that extends radially, in the elastomeric material 111, over all or a portion of the rear face 114 of the half-shell 110. In certain alternatives, the rear connector 100 comprises a single anti-rotation cavity 160, with the maintaining of one half-shell also providing the maintaining of the other half-shell. In other alternatives, the rear connector 100 comprises an anti-rotation cavity 160 in the rear face of each half-shell 110 in such a way as to provide an independent maintaining of each one of the half-shells.

Regardless of the alternative, the anti-rotation cavity 160 makes it possible to prevent the twisting of the cables in the rear connector 100. Indeed, during the tightening of the rear clamping nut 130, the friction of the rear clamping nut 130 with the half-shells 110a, 110b tends to drive the latter in rotation. The consequence is the driving of the cables which can be twisted and be deteriorated. This twisting, during the tightening of the rear clamping nut, can be prevented by immobilising the half-shells 110 by means of an anti-rotation tool inserted into the anti-rotation cavity 160 of at least one of the half-shells.

Although described through a certain number of examples, alternatives and embodiments, the rear connector according to the invention comprises various alternatives, modifications and improvements that shall appear in an evident manner to those skilled in the art, with the understanding that these alternatives, modifications and improvements are part of the scope of the invention.

The invention claimed is:

1. Device for connecting an electric wiring harness to a rear of an electrical connector, comprising:
   two half-shells configured to be assembled and to receive within them at least one cable of the electric wiring harness,
   a rear clamping nut configured to compress the two half-shells radially around the cable,
   a longitudinal body configured to hold the two half-shells axially,
   a front clamping nut configured to hold the longitudinal body around the electrical connector,
wherein each one of the two half-shells comprises:
   an inner pad made of an elastomeric material, configured to b e in contact with the cable, and
   an outer jacket made of a rigid material, at least partially enveloping the inner pad and configured to be in contact with the rear clamping nut.

2. The device for connecting according to claim 1, wherein the inner pad comprises at least one groove adapted to receive the cable.

3. The device for connecting according to claim 1, wherein the elastomeric material of the inner pad comprises a hardness defined according to a coefficient of adhesion of the cable and/or environmental conditions.

4. The device for connecting according to claim 2, wherein the groove of the inner pad has a geometry defined according to a geometry of the cable so that, combined with the hardness of the elastomeric material, the cable is compressed and held in traction.

5. The device for connecting according to claim 1, wherein the rigid material of the outer jacket is electrically conductive.

6. The device for connecting according to claim 1, wherein the rear clamping nut comprises an inner conical portion and wherein the two half-shells comprise an outer conical portion, complementary with the inner conical portion of the rear clamping nut.

7. The device for connecting according to claim 1, wherein the longitudinal body comprises, on an inner wall, a lug forming a protrusion, against on the half-shells, and forming an axial abutment.

8. The device for connecting according to claim 1, wherein the longitudinal body comprises, on an inner wall, at least one protruding portion pressing on the rear clamping nut and forming a retaining claw.

9. The device for connecting according to claim 1, wherein at least one of the two half-shells comprises, on a rear face, an anti-rotation cavity adapted to receive an anti-rotation tool, during the tightening of the rear clamping nut.

10. Aircraft turbine engine, comprising at least one device for connecting according to claim 1.

* * * * *